B. RYAN.
APPARATUS FOR IRRIGATING AND FERTILIZING SOIL.
APPLICATION FILED DEC. 7, 1915.
1,173,534.
Patented Feb. 29, 1916.
2 SHEETS—SHEET 1.
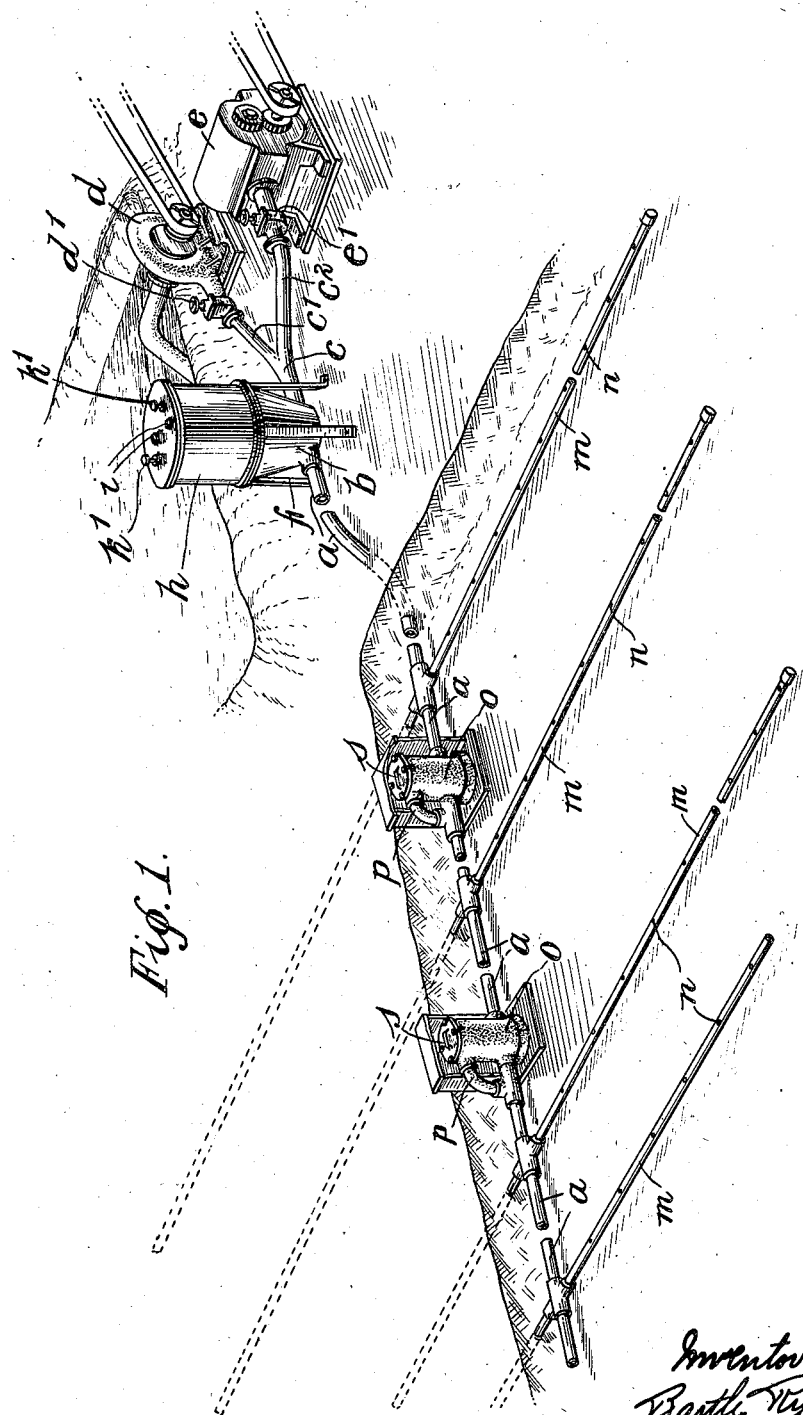

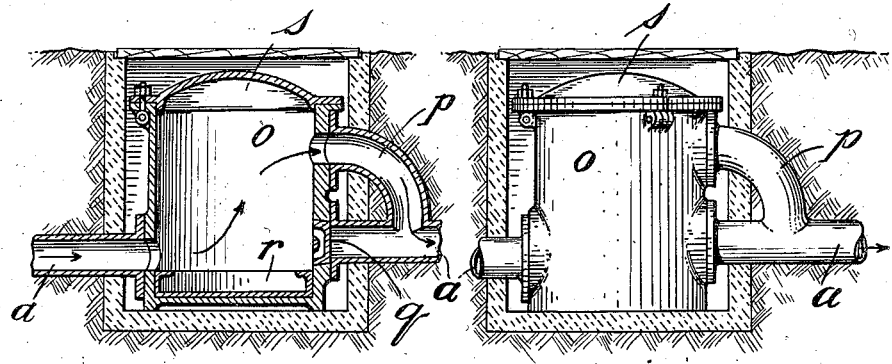
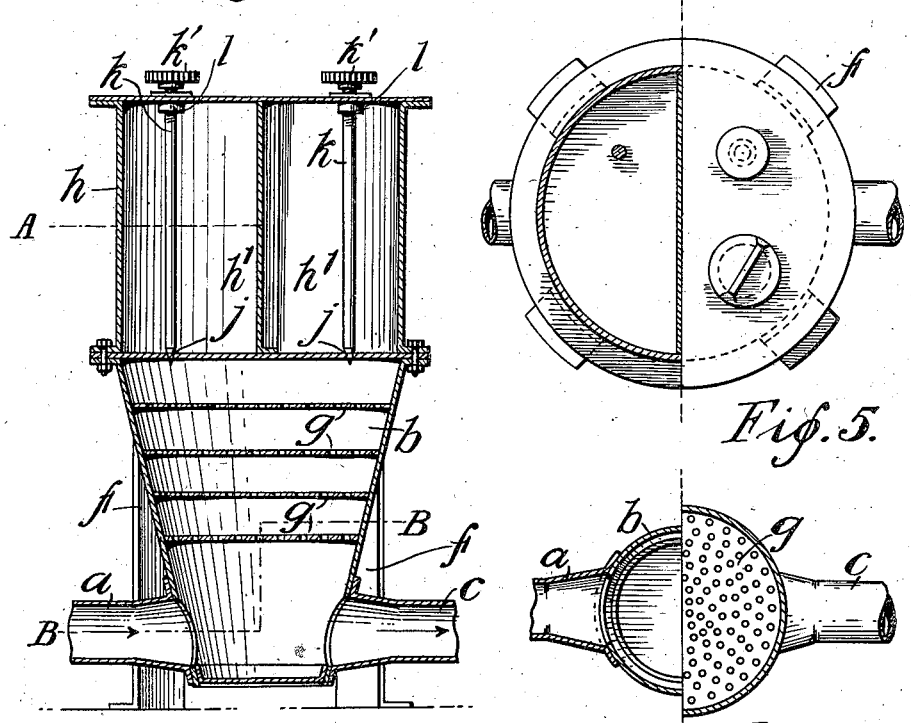

UNITED STATES PATENT OFFICE.

BARTLE RYAN, OF NORTHCOTE, VICTORIA, AUSTRALIA.

APPARATUS FOR IRRIGATING AND FERTILIZING SOIL.

1,173,534.  Specification of Letters Patent.  Patented Feb. 29, 1916.

Application filed December 7, 1915. Serial No. 65,579.

*To all whom it may concern:*

Be it known that I, BARTLE RYAN, of 97 Westgarth street, Northcote, in the State of Victoria, Commonwealth of Australia, have invented certain new and useful Improvements in Apparatus for Irrigating and Fertilizing Soil, of which the following is a specification.

This invention relates to a new and improved apparatus for irrigating and fertilizing soils and embodies an economically constructed and efficient apparatus for carrying the same into practical effect.

Hitherto it has been customary to irrigate land by means of surface sprays, drains and the like means and fertilizing substances when used in a liquid form are distributed in a similar way. When using fertilizing substances of a powdered or dry form they are placed in trenches or drills or spread over the surface of the soil.

The disadvantages of the ordinary method of irrigating are they necessitate the use of a considerable amount of water to insure moisture reaching the roots of the plants and the surface of the soil is caked more or less hard, thereby preventing to a greater or lesser extent a thorough permeation of air or moisture through the soil. Moreover when either water or a fertilizing substance is distributed over the surface of the soil a certain amount of its value is lost due to evaporation or to the failure of the substance to penetrate the soil sufficiently to insure a thoroughly satisfactory result.

The present invention has been devised with the object of overcoming the above-mentioned disadvantages and by its use the soil will be kept thoroughly moist and fertilized to any required depth.

The invention also provides for a perfect aeration of the soil by which means it will be kept "sweet" and insure a perfect growth of crop. Furthermore, the invention can be used for effecting thorough underground draining operations.

The invention consists in means for forcibly projecting water, a mixture of water and a fertilizing agent either in the form of a liquid or vapor with air beneath the surface of the soil and around the roots of the growing plants or crop either in a cold or warm state as required.

In order that the invention may be readily understood reference will now be had to the accompanying sheets of explanatory drawings, wherein:—

Figure 1 is a view in perspective of the apparatus embodied in the invention, and Figs. 2 and 3 are views in sectional side elevation and side elevation, respectively, of part of the apparatus. Fig. 4 is a view in sectional side elevation of another part of the apparatus. Fig. 5 is a view in plan (partly in section) of Fig. 4. Fig. 6 is a view in sectional plan taken on the dotted line B—B of Fig. 3. Fig. 7 is a view in elevation of a constructional detail of the apparatus and hereinafter is fully described.

Throughout the drawings like characters of reference have been used to indicate the same or corresponding parts in the different views and the letter $a$ designates a main pipe which is connected to one side of a mixing chamber $b$ of suitable size and shape. The opposite side of said chamber is fitted with a pipe $c$ which is formed with two branches $c^1$ and $c^2$ to connect with a pump $d$ and a blower $e$, respectively. The chamber $b$ is mounted on a suitable stand $f$ and in the form illustrated is tapered and fitted internally with a plurality of perforated plates $g$ (see Figs. 4 and 6). The pump $d$ is located near a well or other water reservoir and the water therefrom is forced through the the branch pipe $c^1$ to the chamber $b$. The blower $e$ forces air through the branch pipe $c^2$ to the chamber $b$ and cocks $d^1$ and $e^1$ are fitted to the branch pipes to control the quantity of water and air passing there-through.

The pump and blower can be of any approved construction and they can be operated from any convenient source of power as an engine, windmill or horse works. Other arrangements or combinations of pump and blower will occur to those skilled in the art which will fall within the scope of my invention as herein disclosed.

A chamber $h$ is formed above the chamber $b$ and the first-mentioned chamber can be divided by a wall into two compartments $h^1$ for containing powdered or liquid fertilizers. The fertilizers are delivered to the compartments $h^1$ through openings covered by caps $i$ and regulatable quantities of the fertilizers are permitted to pass from the compartments $h^1$ to the chamber $b$ by way of openings controlled by valves $j$. The valves $j$ can be of any approved form and they are operated externally by pins $k$ carrying knurled knobs $k^1$. The pins $k$ formed on the valves $j$ are screwed into bosses $l$ fitted to the top of the chamber $h$ and by operating the knurled knobs $k^1$ the said valves can be opened or closed to regulate the quantities of fertilizer passing from the compartments of said chamber to the chamber $b$ therebeneath.

The fertilizer used is preferably in the form of a liquid or a powder which will dissolve more or less readily with water or other liquid. The water and air delivered to the chamber $b$ passes therefrom to the main distributing pipe $a$ which is placed beneath the surface of the soil. The main distributing pipe $a$ is fitted with a series of laterally projecting branch pipes $m$ the sides of which are provided with series of perforations $n$ of approved size. The main pipe $a$ and the branch pipes $m$ are placed at any desired depth beneath the surface of the soil and the branch pipes preferably are arranged to incline toward the main pipe as shown in Fig. 7 of the drawings.

In order to insure the water being distributed evenly to all the branch pipes $m$ one or more regurgitation traps $o$ can be placed at suitable points in the length of the main pipe $a$ as shown in Figs. 1, 2 and 3. The regurgitation trap comprises a chamber, to the opposite sides and lower part of which the pipe $a$ is connected in an approved way. The inlet part of the pipe $a$ can be situated at a lower level than the outlet part thereof and a by-pass $p$ is formed between the outlet part of the said pipe and the upper part of the chamber. The outlet end of the pipe $a$ leading from the chamber of the trap is normally closed by a removable plug $q$ and the water flows from the said chamber by way of the by-pass $p$. When the plug $q$ is removed water can be passed straight from the pipe $a$ through the pipe $a$ and the branch pipes $m$ to effect drainage operations in the ordinary way.

The volume of water in the regurgitation trap below the by-pass insures a sufficient "head" to cause the water to be distributed evenly through the branch pipes. A removable receptacle $r$ is placed in the bottom of the trap to catch any silt or sand that may enter and be passed through the pipe $a$ and the said receptacle can be removed and emptied by opening an airtight cover $s$ fitted to the top of the said trap. The traps can be arranged in any preferred way and provision is made whereby they will be easily got at to clean or for other purposes.

In operation, when air and water are forced into the lower chamber $b$ and a liquid fertilizer of a volatile nature (such as ammonia) is allowed to trickle thereinto from one of the upper compartments $h^1$ the resultant mixture of air, water and fertilizer will be forced by way of the main and perforated branch pipes into the soil.

In order to effect a more perfect aeration of the fertilizer the lower chamber $b$ can be filled or partially filled with coke or other similar substance (not shown) which will absorb the fertilizer and the air passing through and around the said substance will become moist and in this state be forcibly projected from the perforated pipes. When a powdered dry fertilizer is used a quantity of water is also allowed to pass to the lower chamber and then the air, fertilizer and water will be distributed beneath the surface of the soil through the perforated pipes.

Various forms of fertilizers capable of being vaporized or liquefied can be used and other forms not readily soluble can be used in a powdered form and distributed with the water or moistened compressed air.

If desired air, moistened by contact with the liquid fertilizer in the chamber $b$ can be forced into the pipes $a$ and $m$ without water, and when the soil is only required to be aerated air alone is forced into the said pipes.

The distributing pipes can be made of metal, wood, bamboo or earthenware and can be of any approved size and arranged and connected in any suitable way.

It will be understood that I have shown and described herein only the preferred embodiment of my invention but I contemplate all such modifications thereof as falling within the scope of my invention.

What I do claim is:

1. An apparatus for aerating, irrigating and fertilizing soil, comprising in combination, a mixing chamber, a pump and a blower, pipes connecting the pump and blower to the mixing chamber, a chamber for containing a fertilizer located adjacent to the said mixing chamber, a valve controlling an opening between the said chambers, perforated pipes located beneath the surface of the soil, and a pipe passing from the mixing chamber to said perforated pipes.

2. An apparatus for aerating, irrigating and fertilizing soil, comprising in combination, a mixing chamber, a pump and a blower, pipes connecting the pump and blower to the mixing chamber, a series of superposed perforated plates in the mixing chamber, a chamber for containing a fertilizer located above the said mixing chamber, an opening between said chambers, an externally operatable valve to govern the flow of fertilizer through the said opening, perforated distributing pipes located beneath the surface of the soil, and a pipe leading from the mixing chamber to said perforated distributing pipes.

In testimony whereof I affix my signature in presence of two witnesses.

BARTLE RYAN.

Witnesses:
A. J. CALLINAN,
JAMES H. ANDERSON.